US007834092B2

(12) United States Patent
Uradnisheck et al.

(10) Patent No.: US 7,834,092 B2
(45) Date of Patent: Nov. 16, 2010

(54) ARTICLE COMPRISING POLY(HYDROXYALKANOIC ACID)

(75) Inventors: Julius Uradnisheck, Glen Mills, PA (US); Edmund Arthur Flexman, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 12/412,014

(22) Filed: Mar. 26, 2009

(65) Prior Publication Data

US 2009/0191371 A1 Jul. 30, 2009

Related U.S. Application Data

(63) Continuation-in-part of application No. 11/494,077, filed on Jul. 27, 2006, now abandoned, and a continuation-in-part of application No. 11/516,949, filed on Sep. 7, 2006, now Pat. No. 7,595,363, which is a continuation-in-part of application No. 11/395,422, filed on Mar. 31, 2006, now Pat. No. 7,381,772, which is a continuation-in-part of application No. 10/996,899, filed on Nov. 23, 2004, now Pat. No. 7,354,973.

(60) Provisional application No. 60/529,208, filed on Dec. 12, 2003.

(51) Int. Cl.
*C08G 63/08* (2006.01)
*C08J 5/18* (2006.01)

(52) U.S. Cl. ........................ 525/190; 525/69; 525/450; 264/901

(58) Field of Classification Search .................. 525/190
See application file for complete search history.

(56) References Cited

U.S. PATENT DOCUMENTS

| | | | | |
|---|---|---|---|---|
| 3,264,272 | A | 8/1966 | Rees | |
| 4,044,086 | A | 8/1977 | McChesney et al. | |
| 4,187,358 | A | 2/1980 | Kyo | |
| 4,753,980 | A | 6/1988 | Deyrup | |
| 4,912,167 | A | 3/1990 | Deyrup | |
| 5,443,780 | A | 8/1995 | Matsumoto et al. | |
| 5,883,199 | A | 3/1999 | McCarthy | |
| 6,020,414 | A | 2/2000 | Nelson | |
| 6,114,495 | A | 9/2000 | Kolstad | |
| 6,323,308 | B1 | 11/2001 | Kobayashi | |
| 6,417,298 | B1 | 7/2002 | Ford | |
| 6,713,175 | B1 | 3/2004 | Terada | |
| 6,756,331 | B2 | 6/2004 | Kasemura et al. | |
| 6,943,214 | B2 | 9/2005 | Flexman | |
| 6,960,374 | B1 | 11/2005 | Terada et al. | |
| 7,078,368 | B2 | 7/2006 | Laney | |
| 7,175,917 | B2 | 2/2007 | Sukigara | |
| 7,268,190 | B2 * | 9/2007 | Ohme et al. | 525/400 |
| 7,354,973 | B2 | 4/2008 | Flexman | |
| 7,381,772 | B2 | 6/2008 | Flexman | |
| 2004/0230001 | A1 * | 11/2004 | Flexman | 525/154 |
| 2004/0242803 | A1 * | 12/2004 | Ohme et al. | 525/400 |
| 2005/0131120 | A1 * | 6/2005 | Flexman | 524/399 |
| 2005/0151296 | A1 | 7/2005 | Obuchi et al. | |
| 2006/0009556 | A1 | 1/2006 | Lu | |
| 2006/0173133 | A1 | 8/2006 | Flexman | |
| 2007/0213466 | A1 | 9/2007 | Uradnisheck | |
| 2007/0255013 | A1 | 11/2007 | Becraft | |

FOREIGN PATENT DOCUMENTS

| | | | |
|---|---|---|---|
| JP | 9316310 | A1 | 12/1997 |
| WO | 2003014224 | A1 | 2/2003 |
| WO | 2003082980 | A1 | 10/2003 |
| WO | 2004101642 | A1 | 11/2004 |
| WO | 2005/059031 | A1 | 6/2005 |
| WO | 2006017050 | A1 | 2/2006 |

* cited by examiner

*Primary Examiner*—Randy Gulakowski
*Assistant Examiner*—Mike Dollinger

(57) ABSTRACT

Disclosed are oriented films comprising toughened poly(hydroxy-alkanoic acid) resin compositions comprising poly (hydroxyalkanoic acid) and an impact modifier comprising an ethylene copolymer made from monomers (a) ethylene; (b) one or more olefins of the formula $CH_2{=}C(R^3)CO_2R^4$, where $R^3$ is hydrogen or an alkyl group with 1-6 carbon atoms, such as methyl, and $R^4$ is glycidyl; and optionally (c) one or more olefins of the formula $CH_2{=}C(R^1)CO_2R^2$, where $R^1$ is hydrogen or an alkyl group with 2-8 carbon atoms and $R^2$ is an alkyl group with 1-8 carbon atoms, such as methyl, ethyl, or butyl. The ethylene copolymer may further be made from carbon monoxide monomers. The compositions may further comprise one or more ethylene/acrylate and/or ethylene/vinyl ester polymers, ionomers, and cationic grafting agents. Also disclosed are packaging materials and containers comprising the oriented films.

11 Claims, No Drawings

ARTICLE COMPRISING POLY(HYDROXYALKANOIC ACID)

CROSS REFERENCE

This application is a continuation-in-part of application Ser. No. 11/494,077, filed Jul. 27, 2006, now pending, and Ser. No. 11/516,949, filed Sep. 7, 2006, now allowed. The Ser. No. 11/516,949 application is a continuation-in-part of U.S. application Ser. No. 11/395,422, filed Mar. 31, 2006, now U.S. Pat. No. 7,381,772; which is a continuation in-part of U.S. application Ser. No. 10/996,899, filed Nov. 23, 2004, now U.S. Pat. No. 7,354,973; which claims the benefit to U.S. provisional application No. 60/529,208, filed Dec. 12, 2003. The entire disclosures of all of these priority applications are incorporated herein by reference.

FIELD OF THE INVENTION

The invention relates to articles such as oriented films and sheets comprising thermoplastic toughened poly(hydroxyalkanoic acid) compositions.

BACKGROUND OF THE INVENTION

Poly(hydroxyalkanoic acid) (PHA) polymers such as poly (lactic acid) (PLA) can be polymerized from renewable sources rather than petroleum and are compostable. They have a broad range of industrial and biomedical applications as films. For example, JP patent application H9-316310 discloses a poly(lactic acid) resin composition comprising PLA and modified olefin compounds. Examples of those modified olefin compounds are ethylene-glycidyl methacrylate copolymers grafted with polystyrene, poly(dimethyl methacrylate), etc., and copolymers of ethylene and alpha-olefins grafted with maleic anhydride and maleimide. Toughened PHA compositions are also disclosed in, for example, US patent application 2005/0131120; U.S. Pat. Nos. 5,883,199, 6,960,374, 6,756,331, 6,713,175, 6,323,308, and 7,078,368; and EP0980894 A1 (films are not transparent).

However, PHAs form brittle cast films of low elongation. Orientation with strain assisted crystallization of amorphous cast film is often used to increase the stiffness or modulus of films as well as elongation. A modulus in the direction of film travel higher than 300,000 psi allows thin film not to elongate highly under tensions that can occasionally happen with continuous film conversion processes. This lower elongation helps to avoid cracking of brittle surface coatings such as glass-barrier coatings or avoids missing registration for printing, performance, or other operations necessary for converting the film into useful finished products. Such orientation processes decrease the elongation-at-break in the direction of the lower orientation. Many continuous film processes require the film being handled to have an elongation at break of more than 2%, so that the film may not break or split during start-up of the line or when the distance between tension control and the tensioning roll is high. Accordingly, it is desirable to obtain a toughener for PHAs that allows a PHA composition to be easily processed as an oriented film into a variety of articles with an acceptable level of toughness, such as improved elongation at break, while retaining the desired high modulus and clarity.

SUMMARY OF THE INVENTION

The invention provides an oriented film comprising or prepared from a composition comprising (i) from about 60 to about 99.8 weight % of poly(hydroxyalkanoic acid) and (ii) about 0.2 to about 40 weight % of an impact modifier comprising an ethylene copolymer derived from copolymerizing (a) about 20 to about 95 weight % ethylene, (b) from about 0.5 to about 25 weight % of one or more first olefins of the formula $CH_2{=}C(R^3)CO_2R^4$; (c) from 0 to about 70 weight % of one or more second olefins of the formula $CH_2{=}C(R^1)CO_2R^2$, and (d) from 0, or 0.1, to about 20 weight % carbon monoxide where $R^1$ is hydrogen or an alkyl group with 1 to 8 carbon atoms, $R^2$ is an alkyl group with 1 to 8 carbon atoms, where $R^3$ is hydrogen or an alkyl group with 1 to 6 carbon atoms, $R^4$ is glycidyl, the weight % of the poly(hydroxyalkanoic acid) and the impact modifier are based on the total weight of the poly(hydroxyalkanoic acid) and the impact modifier, and the weight % of ethylene, $CH_2{=}C(R^1)CO_2R^2$, or $CH_2{=}C(R^3)CO_2R^4$ or carbon monoxide in the modifier is based on the modifier or copolymer weight.

An embodiment of the oriented film is a monolayer film comprising the composition described above. The film has no elongation at break less than 2%, for example, less than 6%.

Another embodiment is a multilayer structure, such as a film or sheet, comprising a layer comprising or prepared from the composition described above and at least one additional layer comprising a material selected from the group consisting of ethylene vinyl acetate copolymer, ethylene acid copolymer or ionomer thereof, polyvinylidene chloride (PVDC) homopolymer or copolymer, other polyester, polyvinyl alcohol (PVOH), ethylene vinyl alcohol copolymer (EVOH), polyamide, aluminum, silicon oxides, aluminum oxides, and paper.

DETAILED DESCRIPTION OF THE INVENTION

All references disclosed herein are incorporated by reference.

"Copolymer" means polymers containing two or more different monomers. "Copolymer of various monomers" means a copolymer whose units are derived from the various monomers.

Compostable polymers are those that are degradable under composting conditions. They break down under the action of organisms (annelids) and microorganisms (bacteria, fungi, algae), achieve total mineralization (conversion into carbon dioxide, methane, water, inorganic compounds or biomass under aerobic conditions) at a high rate and are compatible with the composting process.

Biodegradable polymers are those that are capable of undergoing decomposition into carbon dioxide, methane, water, inorganic compounds or biomass in which the predominant mechanism is the enzymatic action of microorganisms that can be measured by standardized tests, in a specified time, reflecting available disposal conditions.

Renewable polymers are those that comprise or are prepared from raw or starting materials that are or can be replenished sooner than within a few years (unlike petroleum which requires thousands or millions of years), such as by fermentation and other processes that convert biological materials into feedstock or into the final renewable polymer.

PHA polymers are biodegradable polymers. A number of these are also available from processing renewable resources, such as production by bacterial fermentation processes or isolated from plant matter that include corn, sweet potatoes, and the like.

PHA compositions include polymers prepared from polymerization of hydroxyalkanoic acids having from 2 to 7 (or more) carbon atoms, including the polymer comprising 6-hydroxyhexanoic acid, also known as polycaprolactone (PCL), and polymers comprising 3-hydroxyhexanoic acid, 4-hydroxyhexanoic acid and 3-hydroxyheptanoic acid. Of note are poly(hydroxyalkanoic acid) polymers comprising hydroxyalkanoic acids having five or fewer carbon atoms, for example, polymers comprising glycolic acid, lactic acid, 3-hydroxypropionate, 2-hydroxybutyrate, 3-hydroxybutyrate, 4-hydroxybutyrate, 3-hydroxyvalerate, 4-hydroxyvalerate and 5-hydroxyvalerate. Notable polymers include poly (glycolic acid) (PGA), poly(lactic acid) (PLA) and poly (hydroxybutyrate) (PHB). PHA compositions also include blends of two or more PHA polymers, such as a blend of PHB and PCL.

Polyhydroxyalkanoic acids are often produced by bulk polymerization. A PHA may be synthesized through the dehydration-polycondensation of the hydroxyalkanoic acid. A PHA may also be synthesized through the dealcoholization-polycondensation of an alkyl ester of hydroxyalkanoic acid or by ring-opening polymerization of a cyclic derivative such as the corresponding lactone or cyclic dimeric ester. The bulk polymerization is usually carried out using either a continuous process or a batch process. JP patent application JP-A 03-502115 discloses a process wherein bulk polymerization for cyclic esters is carried out in a twin-screw extruder. JP-A 07-26001 discloses a process for the polymerization for biodegradable polymers, wherein a bimolecular cyclic ester of hydroxycarboxylic acid and one or more lactones are continuously fed to a continuous reaction apparatus having a static mixer for ring-opening polymerization. JP-A 07-53684 discloses a process for the continuous polymerization for aliphatic polyesters, wherein a cyclic dimer of hydroxycarboxylic acid is fed together with a catalyst to an initial polymerization step, and then continuously fed to a subsequent polymerization step built up of a multiple screw kneader. U.S. Pat. Nos. 2,668,162 and 3,297,033 describe batch processes.

PHA polymers also include copolymers comprising more than one hydroxyalkanoic acid, such as polyhydroxy-butyrate-valerate (PHB/V) copolymers and copolymers of glycolic acid and lactic acid (PGA/LA). Copolymers can be prepared by catalyzed copolymerization of a polyhydroxyalkanoic acid or derivative with one or more cyclic esters and/or dimeric cyclic esters. Such comonomers include glycolide (1,4-dioxane-2,5-dione), the dimeric cyclic ester of glycolic acid; lactide (3,6-dimethyl-1,4-dioxane-2,5-dione); α,α-dimethyl-β-propiolactone, the cyclic ester of 2,2-dimethyl-3-hydroxypropanoic acid; β-butyrolactone, the cyclic ester of 3-hydroxybutyric acid; δ-valerolactone, the cyclic ester of 5-hydroxypentanoic acid; ε-caprolactone, the cyclic ester of 6-hydroxyhexanoic acid, and the lactones of its methyl substituted derivatives such as 2-methyl-6-hydroxyhexanoic acid, 3-methyl-6-hydroxyhexanoic acid, 4-methyl-6-hydroxyhexanoic acid, 3,3,5-trimethyl-6-hydroxyhexanoic acid, etc.; the cyclic ester of 12-hydroxydodecanoic acid; 2-p-dioxanone; and the cyclic ester of 2-(2-hydroxyethyl)-glycolic acid.

PHA compositions also include copolymers of one or more hydroxyalkanoic acid monomers or derivatives with other comonomers, including aliphatic and aromatic diacid and diol monomers such as succinic acid, adipic acid, and terephthalic acid and ethylene glycol, 1,3-propanediol, and 1,4-butanediol. Around 100 different monomers have been incorporated into PHA copolymers.

PHA polymers and copolymers may also be made by living organisms or isolated from plant matter. Numerous microorganisms have the ability to accumulate intracellular reserves of PHA polymers. For example, the copolymer poly(3-hydroxybutyrate-co-3-hydroxyvalerate) (PHB/V) has been produced by fermentation of the bacterium *Ralstonia eutropha*. Fermentation and recovery processes for other PHA types have also been developed using a range of bacteria including *Azotobacter, Alcaligenes latus, Comamonas testosterone* and genetically engineered *E. coli* and *Klebsiella*. U.S. Pat. No. 6,323,010 discloses a number of PHA copolymers prepared from genetically modified organisms.

When used generally, "poly(hydroxyalkanoic acid)" refers to a polymer or composition comprising any homopolymer or copolymer comprising a hydroxyalkanoic acid and mixtures thereof, such as those homopolymers, copolymers and blends listed above. When a specific hydroxyalkanoic acid is used, such as PGA, poly(lactic acid) or poly(hydroxybutyrate), the term includes homopolymers, copolymers or blends comprising the hydroxyalkanoic acid used in the term.

Glycolic acid is derived from sugar cane. PGA can be synthesized by the ring-opening polymerization of glycolide and is sometimes referred to as poly-glycolide. Synthesis and thermal properties are described in "POLYMER", 1979, Vol 20, December, pp. 1459-1465.

PLA includes poly(lactic acid) homopolymers and copolymers of lactic acid and other monomers containing at least 50 mole % of repeat units derived from lactic acid or its derivatives and mixtures thereof having a number average molecular weight of 3,000 to 1,000,000, 10,000 to 700,000, or 20,000 to 600,000. The higher molecular weights provide for higher toughness in film, but also undesirably high melt viscosity for many film extrusion processes. For example, PLA may contain at least 70 mole % of repeat units derived from (e.g., made by) lactic acid or its derivatives. PLA homopolymers and copolymers can be derived from d-lactic acid, I-lactic acid, or a mixture thereof. A mixture of two or more poly(lactic acid) polymers can be used. PLA may be prepared by the catalyzed ring-opening polymerization of the dimeric cyclic ester of lactic acid, also referred to as "lactide." As a result, PLA is also referred to as "polylactide."

Copolymers of lactic acid are typically prepared by catalyzed copolymerization of lactic acid, lactide or another lactic acid derivative with one or more cyclic esters and/or dimeric cyclic esters as described above.

The composition may comprise PHA in an amount ranging from a lower limit of about 60, 70 or 80, 85, 90 or 95 weight % to an upper limit of about 97, 99, 99.5, or 99.8 weight %, based on the total amount of PHA and impact modifier used.

"Ethylene copolymer" refers to a polymer derived from ethylene and at least one additional monomer.

The impact modifier can be present in the composition in an amount ranging from a lower limit of about 0.2, 0.5, 1 or 3 weight % to an upper limit of about 5, 10, 15, 20, 30 or 40 weight %.

Ethylene copolymer impact modifier may be at least one random polymer made by polymerizing monomers (a) ethylene; (b) one or more olefins of the formula $CH_2{=}C(R^3)CO_2R^4$, where $R^3$ is hydrogen or an alkyl group with 1 to 6 carbon atoms, such as methyl, and $R^4$ is glycidyl; and optionally (c) one or more olefins of the formula $CH_2{=}C(R^1)CO_2R^2$, where $R^1$ is hydrogen or an alkyl group with 1 to 8 carbon atoms and $R^2$ is an alkyl group with 1 to 8 carbon atoms, such as methyl, ethyl, or butyl. Repeat units derived from monomer (a) may comprise from a lower limit of about 20, 40 or 50 weight % to an upper limit of about 80, 90 or 95 weight % of the of the total weight of the ethylene copolymer. Repeat units derived from monomer (b) may comprise from a lower limit of about 0.5, 2 or 3 weight % to an upper limit of about 17, 20, or 25 weight % of the total weight of the ethylene copolymer. An example of the ethylene copolymer is derived from ethylene and glycidyl methacrylate and is referred to as EGMA. Optional monomers (c) can be butyl acrylates. One or more of n-butyl acrylate, tert-butyl acrylate, iso-butyl acrylate, and sec-butyl acrylate may be used. An example of the ethylene copolymer is derived from ethylene, butyl acrylate, and glycidyl methacrylate and is referred to as EBAGMA. Repeat units derived from monomer (c), when present, may comprise from a lower limit of about 3, 15 or 20 weight % to an upper limit of about 35, 40 or 70, weight % of the total weight of the ethylene copolymer.

The ethylene copolymer derived from the monomers (a), (b) and optionally (c) above may additionally comprise or be derived from (d) carbon monoxide (CO) monomers. When present, repeat units derived from carbon monoxide may comprise from a lower limit of about 0.1 or 3 weight % to an upper limit of about 15 or 20 weight % of the total weight of the ethylene copolymer.

The ethylene copolymers can be prepared by direct polymerization of the foregoing monomers in the presence of a free-radical polymerization initiator at elevated temperatures, from about 100 to about 270° C. or from about 130 to about 230° C., and at elevated pressures, at least from about 70 MPa or about 140 to about 350 MPa. The ethylene copolymers may also be prepared using a tubular process, an autoclave, or a combination thereof, or other suitable processes. The ethylene copolymers may be not fully uniform in repeat unit composition throughout the polymer chain due to imperfect mixing during polymerization or variable monomer concentrations during the course of the polymerization. The ethylene copolymers are not grafted or otherwise modified post-polymerization.

The impact modifier may further comprise one or more copolymers of ethylene and an acrylate ester such ethyl acrylate or butyl acrylate or a vinyl ester such as vinyl acetate in up to about 90 weight % based on the total weight of the impact modifier. For example, an ethylene alkyl acrylate copolymer, such as an ethylene/methyl acrylate copolymer, may be present in an amount from a lower limit of about 1, 5, or 10 weight % to an upper limit of about 30, 40, 50, 75, or 90 weight %, based on the total weight of the impact modifier.

The impact modifier may further comprise at least one optional ionomer, a polymer containing carboxyl group moieties that have been neutralized or partially neutralized with alkali metal, transition metal, or alkaline earth metal cations such as zinc, manganese, magnesium, cadmium, tin, cobalt, antimony, or sodium, potassium, lithium, or combinations of two or more thereof, notably zinc, sodium, lithium, or magnesium. Examples of ionomers are described in U.S. Pat. Nos. 3,264,272 and 4,187,358. Examples of suitable carboxyl group-containing polymers include, but are not limited to, ethylene/acrylic acid copolymers and ethylene/methacrylic acid copolymers. The carboxyl group containing polymers may also be derived from one or more additional monomer, such as but not limited to, alkyl acrylates like butyl acrylate. Ionomers are commercially available from E.I. du Pont de Nemours and Company, Wilmington, Del. (DuPont). When used, the ionomers may be present in about 0.1 or 0.5 to about 10 weight %, based on the total weight of the impact modifier. It may be desirable to use less than 5 weight %, or less than 1 weight %, of the ionomer, based on the total weight of the impact modifier, to maintain suitable viscosity and minimize formation of gels or other film defects.

The composition may further comprise at least one optional cationic catalyst, which can improve the toughening properties. Such catalysts are described in U.S. Pat. No. 4,912,167 and are sources of catalytic cations such as $Al^{3+}$, $Cd^{2+}$, $Co^{2+}$, $Cu^{2+}$, $Fe^{2+}$, $In^{3+}$, $Mn^{2+}$, $Nd^{3+}$, $Sb^{3+}$, $Sn^{2+}$, and $Zn^{2+}$. Suitable catalysts include, but are not limited to, salts of hydrocarbon mono-, di-, or polycarboxylic acids, such as acetic acid and stearic acid. Inorganic salts such as carbonates may also be used. Examples of such catalysts include, but are not limited to, stannous octanoate, zinc stearate, zinc carbonate, and zinc diacetate (hydrated or anhydrous). When used, the cationic catalyst may comprise about 0.01 to about 3 parts by weight per hundred parts by weight of PHA and impact modifier.

The films comprising the toughened PHA composition can further comprise optional one or more additives, that preferably do not interfere with making amorphous films that can also be oriented and partly crystallized, used in polymer films including plasticizers, stabilizers, antioxidants, ultraviolet ray absorbers, hydrolytic stabilizers, anti-static agents, dyes or pigments, fillers, fire-retardants, lubricants, reinforcing agents such as flakes, processing aids, antiblock agents, release agents, and/or combinations of two or more thereof.

These additives may be present in the compositions up to about 20% of the composition, or from 0.01 to 7 weight %, or from 0.01 to 5 weight % of the total composition, so long as they do not detract from the basic and novel characteristics of the composition (the weight percentages of such optional additives are not included in the total weight percentages of the compositions described above). Many such additives may be present in from 0.01 to 5 weight %. For example, the compositions may contain from about 0.5 to about 5 weight % plasticizer; from about 0.1 to about 5 weight % antioxidants and stabilizers; from about 3 to about 20 weight % fillers; from about 0.5 to about 10 weight % nanocomposite; and/or from about 1 to about 20 weight % flame retardants. Examples of suitable fillers include minerals such as precipitated $CaCO_3$, talc, muscovite, montmorillonite, graphite, and vermicullite. Fillers, when used, are of small size to avoid interfering with preparation and orientation of a film sheet. For example, a film may be less than 2 mils in thickness; accordingly, any solid additive may be less than that size.

The composition can be prepared by melt blending the PHA and ethylene copolymer until they are homogeneously dispersed to the naked eye and do not delaminate upon film formation. Other materials (e.g., ethylene-acrylate copolymers, ionomers, catalysts, and other additives) may be also uniformly dispersed in PHA-ethylene copolymer matrix. The blend may be obtained by combining the component materials using any melt-mixing method known in the art. For example: 1) the component materials may be mixed to homogeneity using a melt-mixer such as a single or twin-screw extruder, blender, kneader, Banbury mixer, roll mixer, etc., to give a resin composition; or 2) a portion of the component materials can be mixed in a melt-mixer, and the rest of the component materials subsequently added and further melt-mixed until homogeneous.

The compositions may be formed into largely amorphous cast films by extrusion through a slit die or calendering followed by rapid cooling or quenching on a drum. In cast films the PHA may be largely amorphous and then oriented as described below.

The film may be further oriented beyond the immediate casting and quenching of the film. Orienting comprises drawing or stretching the quenched coextrudate in at least one direction and optionally heat setting the film for the required degree of thermal-dimensional stability or partially heat set if the film is to have heat-shrinkage properties. In the case of the modified PHA compositions, orientation and/or heat setting can induce crystallization of the PHA. Crystallinity of the PHA can be valuable because it may give the films heat resistance, higher modulus and dimensional stability at elevated temperature. The degree of crystallinity of a film sample can be determined by Differential Scanning Calorimetry (DSC).

The film may be uniaxially oriented (drawn in one direction) to provide high tensile strength in the Machine Direction (MD) such as can be useful for tapes and straps. The film can also be biaxially oriented by drawing in two mutually perpendicular directions in the plane of the film to achieve a satisfactory combination of mechanical and physical properties. Such biaxial stretching can be done sequentially such as first in the MD and then in the Transverse Direction (TD), or simultaneously such as in the two perpendicular directions at the same time. In any case orientation is accomplished at temperatures above the Tg of the amorphous PHA. To ensure crystallinity at the end of the orientation process the orientation temperature is half way between the Tg and the melt point.

Orientation and stretching apparatus to uniaxially or biaxially stretch film are known in the art and may be adapted by those skilled in the art to produce the films described herein. Examples of such apparatus and processes include, for example, those disclosed in U.S. Pat. Nos. 3,278,663; 3,337,665; 3,456,044; 4,590,106; 4,760,116; 4,769,421; 4,797,235 and 4,886,634.

Heat setting can be accomplished by holding the film under sufficient-tension to avoid relaxation while heating to a temperature, for PLA, from about 85° C. to 110° C. The heat set temperature is preferably the temperature of fastest crystallization rate, which is usually between melt temperature and the glass transition temperature Tg. For PHA composition having a melt temperature of about 150° C. and a Tg of 55° C., heat setting can be conducted most rapidly at 110° C. For a PHA composition having a melt temperature of about 170° C. heat setting may be conducted at 120° C. Such treatment may enable the resulting film to withstand heat equivalent to the heat set temperature used, with reduced shrinkage. Heat set temperatures may also be conducted at the maximum temperature designed for the use of the film.

Alternatively, no heat set treatment may be applied if it is desired that the resulting film has shrinkage properties, that is, if the film application requires the film to shrink if heated to, for example, above its Tg.

An oriented blown film may be prepared where simultaneous biaxial orientation is effected by extruding a primary tube which is subsequently quenched, reheated and then expanded by internal gas pressure to induce transverse orientation, and drawn by differential speed nip or conveying rollers at a rate which may induce longitudinal orientation.

The processing can be carried out in a manner similar to that disclosed in U.S. Pat. No. 3,456,044, but using higher internal gas pressure. More particularly, a primary tube is melt extruded from an annular die. This extruded primary tube is cooled quickly to minimize crystallization. It is then heated to its orientation temperature (for example, by means of a water bath). In the orientation zone of the film fabrication unit a secondary tube is formed by inflation, thereby the film is radially expanded in the transverse direction and pulled or stretched in the machine direction at a temperature such that expansion occurs in both directions, preferably simultaneously; the expansion of the tubing being accompanied by a sharp, sudden reduction of thickness at the draw point. The tubular film is then again flattened through nip rolls. The film can be reinflated and passed through a heat setting step, during which step it is heated once more to adjust the shrink properties.

The oriented films may comprise a single layer of the toughened PHA composition (a monolayer film). Alternatively, oriented multilayer films or sheets comprise a layer of the toughened PHA composition and at least one additional layer comprising a different material.

In principle, any film-grade polymeric resin or material known in the art of packaging can be employed to prepare additional layers in a multilayer film structure if the polymer can be melt processed within about 25° C. of the melt processing temperature of the PHA and provided polymer softens at the orientation temperature of the PHA and therefore does not interfere with the orientation process.

Multilayer structures can be prepared by laminating the oriented PHA with other layers. For example, in many cases, the multilayer polymeric sheet may involve at least three categorical layers including, but not limited to, an outermost structural or abuse layer, an inner or interior barrier layer, and an innermost layer making contact with and compatible with the intended contents of the package and capable of forming any needed seals. Other layers present to serve as adhesive to help bond these layers together may be applied from solvent bases or as hot melts via a film lamination process.

The outermost structural or abuse layer may be prepared from the toughened PHA composition. Additional structure layers may include oriented polyester or oriented polypropylene, but can also include oriented polyamide (nylon). This outer layer preferably is unaffected by the sealing temperatures used to make a package, since the package is sealed through the entire thickness of the multilayer structure. This layer optionally may have a seal initiation temperature such that it allows for tacking down a flap or lap seal. The thickness of this layer is typically selected to control the stiffness of the packaging film, and may range from about 10 to about 60 μm, preferably about 50 μm. It is preferable that the structure layer can be printed, for example, by reverse printing using rotogravure coating methods.

The inner layer can include one or more barrier layers to reduce the permeation rate through the layer by water, oxygen, carbon dioxide, electromagnetic radiation such as ultraviolet radiation, and methanol that potentially can affect the product inside the pouch. Such barrier layers can be applied by various methods such as solvent or aqueous coating, vacuum deposition, chemical vapor deposition, coextrusion, lamination and extrusion coating.

Barrier layers can comprise, for example, metallized polypropylene (PP) or polyethylene terephthalate (PET), ethylene vinyl alcohol (EVOH), polyvinyl alcohol (PVOH), polyvinylidene chloride, aluminum foil, silicon oxides (SiOx), aluminum oxide ($Al_2O_3$), aromatic nylon, blends or composites of the same as well as related copolymers thereof. Barrier layer thickness will depend on the sensitivity of the product and the desired shelf life.

The structure and barrier layers can be combined to comprise several layers of polymers that provide effective barriers to moisture and oxygen and bulk mechanical properties suitable for processing and/or packaging the product, such as clarity, toughness and puncture-resistance.

The innermost layer of the package is the sealant. The sealant can have minimum effect on taste or color of the contents, to be unaffected by the product, and to withstand sealing conditions (such as liquid droplets, grease, dust, or the like). The sealant can be a polymeric layer or coating that can be bonded to itself (sealed) at temperatures substantially below the melting temperature of the outermost layer so that the outermost layer's appearance may not be affected by the sealing process and may not stick to the jaws of the sealing bar. Sealants used in multilayer packaging films can include ethylene polymers, such as low density polyethylene (LDPE), linear low density polyethylene (LLDPE), metallocene polyethylene (mPE), or copolymers of ethylene with vinyl acetate (EVA) or methyl acrylate or copolymers of ethylene and acrylic (EA) or methacrylic acid (EMA) (optionally as ionomers). Typical sealants can also include polyvinylidene chloride (PVDC) copolymer, polyester copolymers or polypropylene copolymers. Sealants can be made peelable by, for example, combinations of polymers, tackifiers and fillers. Peelable sealants are available from DuPont. Sealant layers are typically from about 25 to about 100 μm thick.

Polyamides (nylon) can include aliphatic polyamides, amorphous polyamides, or a mixture thereof. "Aliphatic polyamides" can refer to aliphatic polyamides, aliphatic copolyamides, and blends or mixtures of these. Preferred aliphatic polyamides for use in the invention are polyamide 6, polyamide 6.66, blends and mixtures thereof. Polyamides 6.66 are commercially available from BASF AG. The film may further comprise other polyamides such as those described in U.S. Pat. Nos. 5,408,000; 4,174,358; 3,393,210; 2,512,606; 2,312,966 and 2,241,322.

The film may also comprise partially aromatic polyamides to serve as antiscalping or flavor barriers. Some partially aromatic copolyamides are the amorphous nylon resins 6-I/6-T commercially available from DuPont.

Polyolefins can be polypropylene or polyethylene polymers and copolymers comprising ethylene or propylene. Polyethylenes can be prepared by a variety of methods, including well-known Ziegler-Natta catalyst polymerization (see for example U.S. Pat. Nos. 3,645,992 and 4,076,698), metallocene catalyst polymerization (see for example U.S. Pat. Nos. 5,198,401 and 5,405,922) and by free radical polymerization. Polyethylene polymers can include linear polyethylenes such as high-density polyethylene (HDPE), LLDPE, very low or ultralow density polyethylenes (VLDPE or ULDPE) and branched polyethylenes such as LDPE. The densities of suitable polyethylenes range from 0.865 g/cc to 0.970 g/cc. Linear polyethylenes can incorporate α-olefin comonomers such as butene, hexene or octene to decrease their density within the density range so described.

The film can comprise ethylene copolymers such as ethylene vinyl acetate and ethylene methyl acrylate and ethylene (meth)acrylic acid polymers. Polypropylene polymers include propylene homopolymers, impact modified polypropylene and copolymers of propylene and α-olefins.

Anhydride or acid-modified ethylene and propylene homo- and co-polymers can be used as extrudable adhesive layers (also known as "tie" layers) to improve bonding of layers of polymers together when the polymers do not adhere well to each other, thus improving the layer-to-layer adhesion in a multilayer structure. The compositions of the tie layers may be determined according to the compositions of the adjoining layers to be bonded in a multilayer structure. One skilled in the polymer art can select the appropriate tie layer based on the other materials used in the structure. Tie layer compositions may be available from DuPont. Other tie layers include solvent-applied polyurethane compositions.

EVOH having from about 20 to about 50 mole % ethylene can be suitable for use herein. Suitable polyethylene vinyl alcohol polymers are commercially available from Kuraray or from Nippon Gohsei, for example.

PVDC can be obtained commercially from Dow Chemical.

Surface modifiers such as polyglycerol esters for antifogging properties, surface radicalization such as from corona or flame treatment for improved adhesion and printability, silica microspheres or silicones for reduced coefficient of friction, long-chain aliphatic amines for antistatic properties, and primers for improved ink adhesion can also be used in the films.

A multilayer film can be prepared by coextrusion, e.g., melting granulates of the various components in separate extruders; passing the molten polymers through a mixing block that joins the separate polymer melt streams into one melt stream containing multiple layers of the various components; and flowing the melt stream into a die or set of dies to form layers of molten polymers that are processed as a multilayer flow. The stream of layered molten polymers can be cooled rapidly on a quench drum to form a layered structure wherein the PHA component is amorphous. The multilayer structure can be oriented and optionally heat set as described above.

Preferably, a film can be processed on a film fabrication machine at a speed from about 50 meters per minute (m/min) to a speed of about 200 m/min.

Of note is an oriented film comprising a layer of the modified PHA composition and a heat seal layer.

The oriented film may also be laminated to a substrate such as foil, paper or nonwoven fibrous material to provide a packaging material of this invention. Lamination involves laying down a molten curtain of an adhesive composition between the substrate and the PHA film moving at high speeds (typically from about 100 to 1000 feet per minute and preferably from about 300 to 800 feet per minute) as they come into contact with a cold (chill) roll. The melt curtain is formed by extruding the adhesive composition through a flat die. Solution-based adhesive compositions may also be used to adhere the film to the substrate.

Films can be used to prepare packaging materials and containers such as pouches and lidding, balloons, labels, tamper-evident bands, or engineering articles such as filaments, tapes and straps.

The packaging material may also be processed further by, for example, printing, embossing, and/or coloring to provide a packaging material to provide information to the consumer about the product therein and/or to provide a pleasing appearance of the package.

Of note is a package comprising a thermoformed container such as a tray, cup, or bowl comprising PHA, including toughened PHA, and a lidding film comprising an oriented film of the toughened PHA compositions.

The films may also be slit into narrow tapes and drawn further to provide slit film fibers. Such fibers may be useful as degradable sutures. Toughened PGA/LA compositions are particularly useful for such sutures.

The following Examples are merely illustrative, and are not to be construed as limiting the scope of the invention. Example numbers beginning with "C" denotes comparative examples.

Examples 1-4

Compounding: The compositions of the Examples were prepared by compounding in a 28 mm or 30 mm co-rotating Werner & Pfleiderer twin screw extruder with a screw design comprising two hard working segments followed by a vacuum port and twin hole die. The molten material was extruded through a flat die onto a rotating quench drum and rapidly cooled to an amorphous sheet.

Materials Used:

PLA-1 was a poly(lactic acid) with a melting point of about 165° C. and a Tg of about 60° C. available as 3001D from NATUREWORKS LLC a subsidiary of Cargill, Inc. (Minnetonka, Minn.).

EBAGMA-5 was an ethylene/n-butyl acrylate/glycidyl methacrylate terpolymer derived from 66.75 weight % ethylene, 28 weight % n-butyl acrylate, and 5.25 weight % glycidyl methacrylate. It had a melt index of 12 g/10 minutes as measured by ASTM method D1238.

EBAGMA-12 was an ethylene/n-butyl acrylate/glycidyl methacrylate terpolymer derived from 66 weight % ethylene, 22 weight % n-butyl acrylate, and 12 weight % glycidyl methacrylate. It had a melt index of 8 g/10 minutes as measured by ASTM method D1238.

The ingredient quantities in Table 1 are given in weight % based on the total weight of the composition. Comparative Example C1 used non-modified PLA-1.

TABLE 1

| Example | PLA-1 | EBAGMA-5 | EBAGMA-12 |
|---|---|---|---|
| C1 | 100 | 0 | 0 |
| 2 | 99 | 1 | 0 |
| 3 | 95 | 5 | 0 |
| 4 | 90 | 0 | 10 |

The compositions for the Examples shown in Table 1 were melt blended using a Werner and Pfleiderer 28D mm twin screw extruder and nonoriented amorphous cast films were prepared. The screw design was 780 mm long with a vent port above the 550-mm position. The screw used forward conveying elements except prior to the vent port the screw used 45 mm of kneading blocks, 114 mm of reverse elements, 30 mm of kneading blocks, and 135 mm of reverse elements under the vacuum port. The melt fed though a 25.4-cm wide flat die having a 635-micron die-gap. The melt curtain dropped about 12-cm to a chrome-plated casting drum controlled to 11° C.

The extrusion process was run at 125 rpm, barrel set points at 190° C., and the melt temperature was about 210° C. The quench drum was run at such a speed such that the amorphous cast film was about 350 microns thick. The tensile properties of these sheets showed a slight lowering of modulus in proportion to the amount of toughener added.

The drawability properties of the nonoriented amorphous films were tested according to the following procedure:

A sample portion of the test film, 4 inches (10 cm) wide (width in the Transverse Direction) and at least 8.5 inches (22 cm) long (length in the Machine Direction), was affixed at one end to a thermally insulated surface. The free end was placed between two 0.13-inch (33 mm) thick, 8×8-inch (20×20-cm) brass plates heated to 225° F. (107° C.). The remaining free end of the sheet was pulled until the tension dropped, indicative of the film being heated above the glass transition temperature (about 55° C.). The stretch rate was 23% per second and the stretching continued until the tension started to increase, suggesting the sheet had become semicrystalline. Stretch ratios at the location of the samples were determined by measuring the distance between 1-cm tick marks previously marked on the original unstretched sheets. The stretched samples had a total length of about 48 inches (122 cm) from an original length of about 7 inches (18 cm) in about 30 seconds of stretching, for about a 7:1 stretch ratio (amount of orientation at the location of tensile testing). Four samples (5 samples of C1) of each film were analyzed and the results are reported in Table 2A.

Secant Modulus (Table 2B) used 0% strain at one end and yield strain at the other. The tensile properties were measured in the transverse direction using dog-bone samples (1 inch or 2.5 cm long and 0.1875 inch or 4.8 mm wide) with the center axis of the dog-bone in the middle of the sheet. The test rate was 1 inch per minute. Strain at break was defined as the strain between when the force rose above zero to about 0.05 lb and to the point when the force suddenly started to drop. The tensile properties were determined in the machine direction (Table 2C) by sampling from the middle of the sheet at the location recorded for the specified stretch ratio. The stretch ratio is the final length divided by the pre-stretch length.

TABLE 2A

Transverse Tensile Properties of Oriented Sheet

| | Displacement to Break (inch) | Elongation at Break (%) | Thickness (inch) | Force at Break (lb) | Yield Strain (inch) | Secant Modulus (kpsi) | Stretch Ratio |
|---|---|---|---|---|---|---|---|
| C1 | 0.021 | 2.1 | 0.0021 | 2.66 | 0.021 | 338.0 | 7 |
| 2 | 0.026 | 2.6 | 0.0025 | 3.58 | 0.022 | 351.6 | 7.5 |
| 3 | 0.088 | 8.8 | 0.0027 | 2.88 | 0.024 | 230.6 | 6.3 |
| 4 | 0.199 | 19.9 | 0.0028 | 2.32 | 0.021 | 197.7 | 6.5 |

TABLE 2B

Tensile Properties of Amorphous Sheet before Orientation

| Example | Secant Modulus (kpsi) |
|---|---|
| C1 | 315 |
| 2 | 300 |
| 3 | 295 |

TABLE 2C

Machine Direction Tensile Properties of Oriented Sheet

| Example | Elonqation at Break (%) | Secant Modulus (kpsi) |
|---|---|---|
| C1 | 13 | 710 |
| 2 | 21 | 693 |
| 3 | 19 | 620 |

Examples 5-7

Compounding: The compositions of Examples 5-7 were prepared as described above.

Materials Used:

PLA-2 was a poly(lactic acid) with a melting point of about 150° C. and a Tg of about 55° C. available as 2002D from NATUREWORKS LLC.

BLENDEX is BLENDEX 338, an acrylonitrile butadiene styrene copolymer supplied by Chemtura Corporation (Middlebury, Conn.) nominally of the composition 7.5 wt % acrylonitrile, 70 wt % butadiene and 22.5 wt % styrene.

ECOFLEX is ECOFLEX F BX 7011 which is an aliphatic-aromatic copolyester based on the monomers 1,4-butanediol, adipic acid and terephthalic acid and supplied by BASF Aktiengesellschaft (Ludwigshafen, Germany)

TABLE 3

| Example | PLA-2 | EBAGMA-5 | EBAGMA-12 | BLENDEX | ECOFLEX |
|---|---|---|---|---|---|
| C2 | 100 | 0 | 0 | 0 | 0 |
| 5 | 99 | 1 | 0 | 0 | 0 |
| 6 | 95 | 5 | 0 | 0 | 0 |
| 7 | 90 | 0 | 10 | 0 | 0 |
| C3 | 98 | 0 | 0 | 2.2 | 0 |
| C4 | 94 | 0 | 0 | 6.3 | 0 |
| C5 | 95 | 0 | 0 | 0 | 5 |

The compositions for the Examples shown in Table 3 were melt blended using a process similar to that described above to generate an amorphous sheet of the blend. Samples of the amorphous sheet were uniaxially oriented using the procedure described above except in addition to the stretch rate of 23% per second an additional orientation with fresh samples was conducted at 2% per second. The resulting oriented film from the Examples 5 and 6 were nearly as transparent as C2 whereas for Examples C3, C4, and C5 the oriented samples were 3, 10, and 5 times more hazy than examples 5 and 6. The oriented sheets were tested for tensile properties in the transverse direction, machine direction, and secant modulus and the results are shown below in Tables 4A to 4C.

TABLE 4A

| Transverse Direction[A] | | | | | | | | |
|---|---|---|---|---|---|---|---|---|
| Sample | IT (mil) | IW (in) | FT (mil) | FW (in) | SR | BE (%) | SM (kpsi) | BS (psi) |
| C2 | 25 | 4 | 2.9 | 2.1 | 10 | 2.2 | 310 | 5500 |
| 5 | 28 | 4 | 5 | 2 | 11 | 4.3 | 270 | 5500 |
| 6 | 29 | 4 | 5.3 | 1.75 | 10 | 2 | 340 | 3700 |
| C3 | 25 | 4 | 5.1 | 2.25 | 9 | 8 | 210 | 2000 |
| C4 | 18 | 4 | 4 | 1.85 | 10 | 2.5 | 340 | 5000 |
| C5 | 32 | 4 | 6 | 1.7 | 11 | 2.4 | 322 | 5100 |

[A]IT = initial thickness; IW = initial width; FT = final thickness; FW = final width; SR = stretch ratio, BE = break elongation (average of 3 tests); SD = secant module (average of 3 tests); and BR = break stress (average of 3 tests).

TABLE 4B

| Machine Direction | | |
|---|---|---|
| Sample | Elongation at Break | Secant Modulus (kpsi) |
| C2 | 12.4 | 613 |
| 5 | 22.5 | 580 |
| 6 | 14.5 | 587 |
| C3 | 45 | 360 |
| C4 | 28 | 390 |
| C5 | 23 | 520 |

TABLE 4C

| Cast Largely Amorphous Sheet, Before Orientation | |
|---|---|
| Sample | TD Secant Modulus (kpsi) |
| C2 | 330 |
| 5 | 313 |
| 6 | 265 |
| C3 | 340 |
| C4 | 280 |
| C5 | 293 |

The results show the modulus of the amorphous sheet and of the transverse direction of the oriented sheets dropped slightly with higher amounts of toughener. The examples also showed only slight drop of high modulus in the direction of orientation. The comparative examples show a 2× higher dropoff of modulus in the Machine Direction.

Example 8-10

The amorphous sheets of Examples 2-4 (PLA-1 and EBAGMA-5 or EBAGMA-12) are oriented 100% using a different method than that described above. A test amorphous sheet measuring 3 inch by 4 inches (25 mm by 100 mm) is submerged in water controlled to 60° C., 75° C., 90° C. or 100° C. The sheet is held at no tension for approximately 10 seconds. Uniform tension is then applied until the sheet is stretched from 2 inches (51 mm) to 4 inches (100 mm), indicating 2-fold stretch. The resulting sheet is immediately water cooled to below 30° C. The tensile toughness in the machine direction and crystallinity of the oriented sheet are measured.

Examples 11-13

The oriented sheets of Examples 8-10 are thermoformed by first exposing the sheets to 100° C. water for about 20 seconds. The hot sheet is immediately transferred to 100° C. mold of a cup having an inner diameter of 1.5 inches (3.8 cm) and a depth of 1.5 inches (3.8 cm). A 100° C. plunger of 1.0-inch (2.5 cm) diameter forms the heated sheet into the mold at a rate of 0.5 inches (1.25 cm) per second until the sheet either reaches the bottom of the mold or stops before reaching bottom due to a force build-up. The degree of thermoformability is measured. The walls of the formed cup, half way between top and bottom is sampled and tested for tensile properties in the depth direction and degree of crystallinity.

Example 14

The oriented sheets of Examples 8-10 are processed another way to demonstrate shrink-film. The sheets are exposed as 1×4-inch (25×100 mm) strips (4 inches in the Machine Direction) to air heated to 105° C. for 10 seconds.

The dimensional change of the sheet is recorded. The resulting film is tensile tested and the degree of crystallinity determined.

Example 15

Polyhydroxybutanoate from Aldrich is melt blended at its melting temperature with EBAGMA in a Haake Plastograph to generate 55 grams of PHB blended with 5% EBAGMA. The resulting mass is compression molded into an amorphous sheet 15 mil thick by quenching the resulting melted sheet in a circulating water press. The amorphous sheet is then oriented using the procedure of Example 1 and tested similarly.

Example 16

Polyglycolic acid having a melt viscosity above 500 Pa·s at 190° C. and 100 1/s is melt blended at its melting temperature of 230° C. with EBAGMA in a Haake Plastograph to generate 55 grams of PGA blended with 5% EBAGMA. The resulting mass is compression molded between coated brass plates into an amorphous sheet 5 mil thick by quenching the plate and molten polymer assembly in ice water. The amorphous sheet is then oriented using the procedure of Example 1 except the orientation temperature was 120° C. and tested similarly.

The invention claimed is:

1. A film comprising or prepared from a composition comprising about 60 to about 97 weight % of poly(lactic acid) and about 0.2 to about 40 weight % of an impact modifier wherein the film is an oriented film; and the impact modifier comprises an ethylene copolymer that comprises repeat units derived from (a) about 20 to about 95 weight % ethylene, (b) about 0.5 to about 25 weight % of one or more first olefins of the formula $CH_2{=}C(R^3)CO_2R^4$; (c) 3 to about 70 weight % of one or more second olefins of the formula $CH_2{=}C(R^1)CO_2R^2$, and (d) 0 to about 20 weight % carbon monoxide where $R^1$ is hydrogen or an alkyl group with 1-8 carbon atoms, $R^2$ is an alkyl group with 1-8 carbon atoms, where $R^3$ is hydrogen or an alkyl group with 1-6 carbon atoms, $R^4$ is glycidyl, the weight % of the poly(hydroxyalkanoic acid) and the impact modifier are based on the total weight of the poly(hydroxyalkanoic acid) and the impact modifier, and the weight % of ethylene, $CH_2{=}C(R^1)CO_2R^2$, or $CH_2{=}C(R^3)CO_2R^4$ is based on the copolymer weight.

2. The film of claim 1 wherein impact modifier is terpolymer of ethylene, glycidyl methacrylate, and butyl acrylate.

3. The film of claim 1 wherein the ethylene copolymer comprises repeat units derived from about 20 to about 35 weight % of the second olefin.

4. The film of claim 1 wherein the ethylene copolymer comprises repeat units derived from up to about 20 weight % of carbon monoxide.

5. The oriented film of claim 3 wherein the ethylene copolymer comprises repeat units derived from up to about 20 weight % of carbon monoxide.

6. The film of claim 1 wherein the impact modifier further comprises about 1 to about 10 weight % of one or more ionomers, based on the total weight of the impact modifier.

7. The film of claim 1 wherein the impact modifier comprises up to about 90 weight % of one or more copolymers of ethylene and an acrylate ester or vinyl acetate, based on the total weight of the impact modifier.

8. The film of claim 6 wherein the impact modifier comprises up to about 90 weight % of one or more copolymers of ethylene and an acrylate ester or vinyl acetate, based on the total weight of the impact modifier.

9. The film of claim 1 further comprising one or more cationic catalysts.

10. An article comprising an oriented film wherein the article is packaging material or container; the container optionally comprises lidding; the film is as recited in claim 1; and the lidding comprises or is prepared from the film.

11. The article of claim 10 wherein herein the article is a thermoformed container including tray, cup, or bowl.

* * * * *